INVENTOR
Carl R. Taylor
BY
Evans & McCoy
ATTORNEYS

Patented Jan. 9, 1945

2,366,941

UNITED STATES PATENT OFFICE 2,366,941

CONFECTION HANDLING APPARATUS

Carl R. Taylor, Cleveland Heights, Ohio, assignor to The Cream Cone Machine Company, Cleveland, Ohio, a corporation of Ohio Application March 14, 1942, Serial No. 434,695

8 Claims. (Cl. 107—8)

This invention relates to confection handling apparatus, and has particular reference to apparatus of this character for use in transferring congealed confections from the molds in which they are formed or frozen to portable holders by means of which a quantity of the confections are dipped into a coating substance such as chocolate syrup.

In making frozen confections of the well known "frozen drumstick" type, edible plastic substance such as soft ice cream is placed in suitable molds and frozen. Usually the molds are then heated, as by placing them in hot water, to free the confections from the molds, the surfaces of the confections in contact with the molds being slightly melted by the heat. The confections are then withdrawn from the molds and further processed to coat them with chocolate and embellish them with nuts. Devices of various types have been used to pierce or impale the confections while the latter are in the molds for the purpose of lifting the impaled confections from the mold pockets. However, single prong impalers have not proved entirely satisfactory because the frictional engagement of but one impaler piercing each confection does not securely retain the confections on the impalers and the confections are frequently dropped from the impalers. To overcome this objection it has been proposed to use several impalers for simultaneously piercing each confection. Such an arrangement is objectionable because of the greatly increased pressure required to force the multiple impalers into the frozen confections and the danger of breaking the confections. Nor could these objections be overcome by lessening the degree of hardness to which the confections are frozen because it was found that incompletely frozen confections frequently melt excessively before processing is completed. Therefore, it became increasingly important to provide means for rapidly handling the confections to transfer the latter from the molds after the molds have been slightly heated to free the confections. Fancy frozen confections of the type referred to are made by small concerns in which elaborate mechanical equipment cannot be used because of its expense. Therefore, the confections are usually made in relatively small batches, the operator employing suitable devices for simultaneously handling a group of confections. The present invention is directed to the type of equipment used by operators in handling successive batches of confections and has for its principal object the general improvement of apparatus of this character so that the confections can be quickly removed from the molds and quickly and accurately transferred to a holding device for further processing.

Another object of the invention is to provide an improved confection retainer of the impaler type in which a plurality of impalers successively pierce each confection but remain concurrently embedded therein to cooperatively hold the confection.

Another object is to provide an impaling device having rigid impalers that are arranged in pairs, the impalers of each pair being movable along angularly disposed paths so that the impalers may be divergently disposed within each confection.

Another object is to provide a confection retaining or impaling device having relatively movable frames each provided with a plurality of laterally extending impalers, the impalers of one frame being arranged to cooperate with the impalers on the other frame to secure confections in fixed relation to the device.

Another object is to provide a confection retaining device of the character mentioned in which the frames can be readily disassembled for cleaning.

Another object is to provide in combination with a confection holder and a structure for supporting the same a confection mold and a confection impaling device for transferring confections from the mold to the holder, the impaler being provided with guide means for aligning it with the mold and also cooperable with the supporting structure for the holder to align the impaler with the holder. More specifically, the invention aims to provide a supporting structure for a socketed confection holder in combination with a confection retainer for transferring confections to the holder, the supporting structure and the retainer having coacting guide means for maintaining the retainer in alignment with the holder as well as for maintaining the retainer and holder in parallel relation during movement of the retainer toward the holder in placing the confections carried by the retainer in the sockets of the holder.

Another object is to provide a generally improved confection handling apparatus relatively simple in design and construction and inexpensive to manufacture. Other objects and advantages relate to particular details of construction and arrangements of parts that will become apparent from the following detailed description made in connection with the accompanying drawings wherein like parts throughout the several figures are indicated by the same numerals of reference.

Figure 1 is a side elevational view, partly in section and with parts removed, showing an impaling device or retainer embodying certain principles of the invention and also showing a fragmentary portion in section of a suitable multiple pocket mold of the type used in making confections such as "frozen drumsticks." In this view the articulated frames of the retainer are in closed position and the impalers are embedded in the confections contained in the pockets of the mold;

Figure 1:
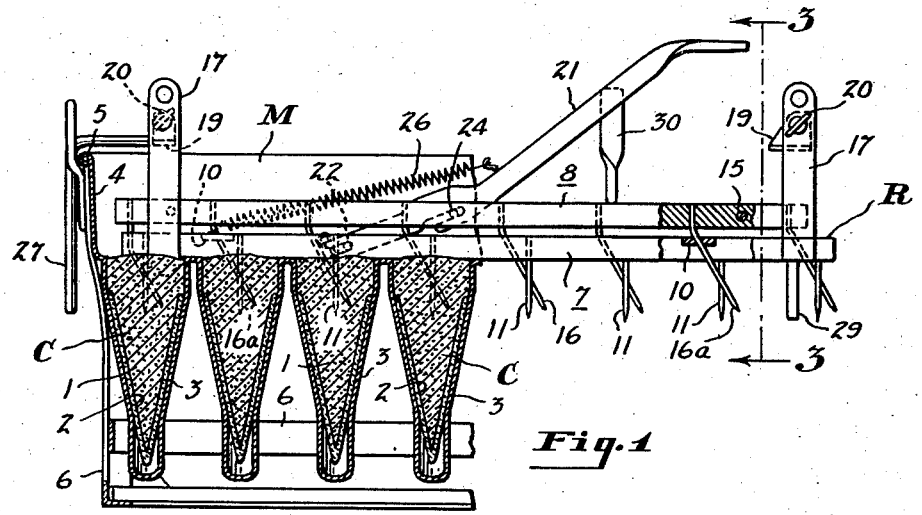

Confections C, each of which may comprise ice cream or similar comestible material 1 contained in a wafer or cake cone 2 and extending above the top of the latter are formed in a mold M having a plurality of spaced depending portions 3 on the bottom of a rectangular pan-like body 4 formed with a rolled rim 5. The mold is preferably made of sheet metal or the like and depending pocket forming portions 3 are shaped to receive the wafer cones 2 and to provide a cylindrical body of ice cream above the top of each cone. The individual pockets in the depending portions 3 of the mold open through the bottom of the body 4 of the mold so that after placing the empty cones or wafers 2 in the empty mold pockets the latter can be readily filled by placing a quantity of soft ice cream or the like in the pan-like body of the mold and flowing it into the pockets. The several pockets are filled to a uniform level even with the bottom of the body 4 and any surplus ice cream is then removed from the mold. The mold with the several pockets thereof filled with the confections in a semi-fluid condition is then placed in a refrigerating medium such as chilled brine which cools the confections, causing the ice cream to congeal or solidify and bond to the wafer cones.

When the confections are frozen to a sufficient degree of hardness the mold is removed from the refrigerant and placed in hot water which surrounds the depending portions 3 of the mold, heating the latter and melting the surfaces of the contained confections to free the latter from the walls of the mold pockets. Either before or after the mold has been transferred to the hot water, a portable impaling device, known as an extractor or retainer R, is placed over the confections to engage the latter, as will be later described. It may be desirable, for the purpose of supporting the mold, to provide it with a suitable frame structure 6, which holds the mold with the bottoms of the depending portions 3 above any surface upon which the mold may be placed.

The retainer or extractor R is preferably made entirely of metal, and comprises a pair of relatively movable frames 7 and 8. The lower frame 7 includes a plurality (three in this case) of longitudinally extending members 9 disposed in parallel relation to one another, connected by parallel cross members 10, and having a plurality of laterally extending sharp pointed impalers 11 rigidly secured thereto. The impalers 11 are parallel to one another and normally depend from the retainer.

The frame 8 is normally disposed above the frame 7 and includes a plurality (in this case three) of longitudinally extending members 14 disposed in parallel relation to one another and connected by parallel cross members 15. The longitudinal members 14 are so arranged on the cross members 15 as to be laterally offset from but parallel to the longitudinal members 9 of the other frame. A plurality of sharp pointed impalers 16 equal in number to the impalers 11 are rigidly secured to the longitudinal members 14 of the frame 8 in spaced relation to one another. These impalers, while being disposed in parallel relation to one another, are arranged at acute angles to the plane of the frame 8, whereas the impalers 11 are disposed at approximately right angles to the plane of the frame 7.

Certain of the oblique impalers, indicated at 16a, of the frame 8 are slidingly received in suitable guide apertures formed in the cross members 10 of the frame 7. Thus the frames are guided for relative parallel movement toward and away from one another, the impalers 16 being constrained to movement over paths that are oblique or at an acute angle to the axes of the impalers 11.

Adjacent the ends of the frame 7 upstanding members 17 are secured to the frame members 9, the upper ends of the members 17 being connected by cross members 18. Angle brackets 19 are disposed against the members 17 and are removably secured thereto as by thumb screws 20. The brackets 19 engage the longitudinally extending members 14 of the frame 8 to limit the relative movement of the frames, thereby preventing withdrawal of the impalers 16a from the guide holes in the cross members 10 of the frame 7.

For actuating the frames to move the same relatively toward and away from one another, a lever 21 is pivoted on a cross member 22 of the frame 7 and is formed with an elongated slot 23 which receives a cross member 24 of the frame 8. The lever is formed with an open ended slot which receives the cross member 22, a pin 25 extending across the slot and serving to prevent withdrawal therefrom of the cross member 22. Upon removing the pin 25, the lever can be released from the cross member of the frames to disassemble the device, the slot 23 having an open end for such purpose. Removing the angle brackets 19 permits withdrawal of the impalers 16a from the guide holes of the frame 7 so that the two frames can be separated for cleaning. If desired, the lever 21 may be connected by means of a helical tension spring 26 to one of the cross members 10 of the frame 7 to normally hold the frames in the relative positions shown in Fig. 4 in which the impalers 16 are in retracted positions.

Figure 2:
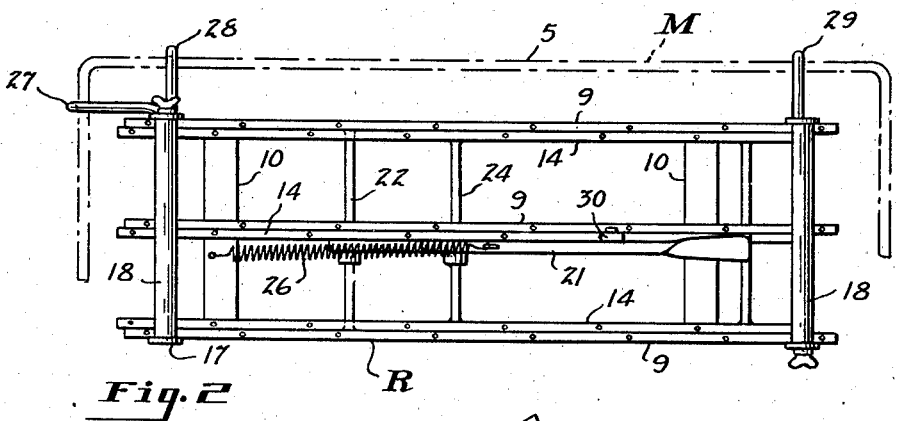
Fig. 2 is a top plan view of the impaling device or retainer shown in Fig. 1, a portion of the outline of the mold being indicated by broken lines.

Secured to upper portions of the end members 17 are L-shaped guides 27, 28 and 29 having depending leg portions that are disposed in generally parallel relation to one another and to the impalers 11 of the frame 7. As shown in Fig. 2, the guides are arranged so that in positioning the retainer over the mold the depending leg portions of the guides 28 and 29 engage the outside of the bead 5 of the mold M along one side of the latter, while the depending leg portion of the guide 27 engages the bead 5 along one end of the mold. The leg portions of the guides are so spaced with respect to the frames of the impaling device that when the operator draws the guides snugly against the beads of the mold, the depending impalers 11 are individually centered over the confection containing pockets of the mold.

Figure 4:
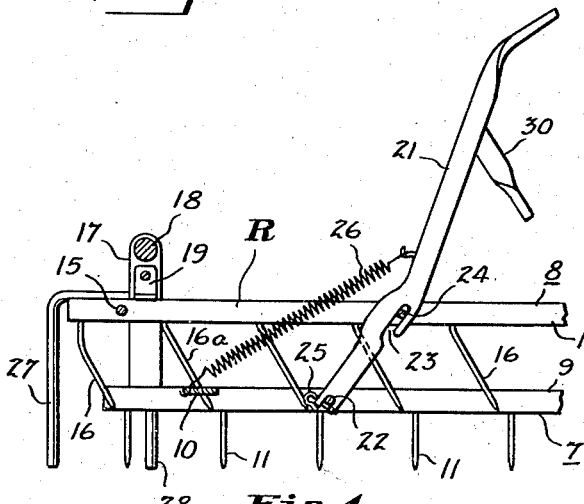
Fig. 4 is a fragmentary elevational view of the retainer showing the frames separated.
Figure 3:
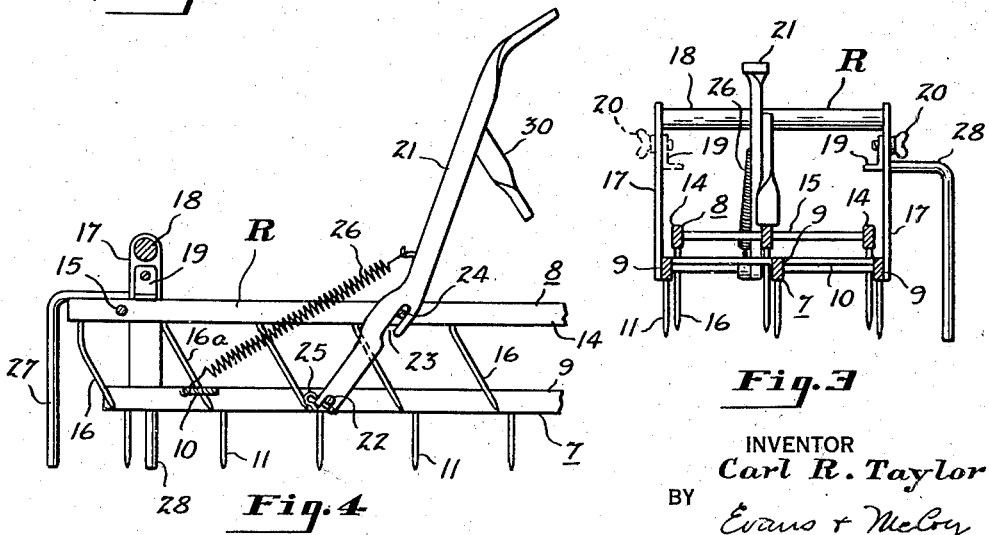
Fig. 3 is a sectional view with parts removed taken substantially on the line 3—3 of Fig. 1.

To manipulate the retainer for the purpose of removing confections from the mold the operator separates the articulated frames 7 and 8 by lifting the lever 21 so that the impalers are relatively disposed in the positions shown in Fig. 4. He then grasps the cross members 18 which serve as handles for the device and then lifts it to a position above the mold M, the latter being disposed in the hot water, as previously mentioned, or supported on a suitable stand or table adjacent the hot water bath. As the operator lowers the impaling device into the mold he exerts a slight lateral pressure to retain the guides 27, 28 and 29 in sliding engagement with the bead 5 of the mold. As soon as the impalers 11 engage the tops of the frozen confections in the mold portions the operator exerts downward pressure on the handles 18, which forces the impalers 11 vertically downward into the centers of the several confections. This downward impaling movement is limited by engagement of the frame 7 with the floor of the body portion 4 of the mold. As soon as the impalers 11 are completely embedded in the confections the operator moves the lever 21 from the raised position shown in 21 to the position shown in Fig. 1. This movement of the lever shifts the frame 8 toward the frame 7, forcing the impalers 16 obliquely into the confections along paths oblique or at acute angles to the paths over which the impalers 11 were forced into the confections. If desired, a stop 30 may be provided on the lever 21 to engage the frame 8 and limit the movement of the impalers 16.

With the impalers 11 and 16 disposed within the tops of the confections in angular or divergent relation the several confections are securely attached to the retainer and upon lifting of the retainer from the mold all of the confections are withdrawn therefrom in unison. The operator then carries the retainer with the attached confections to an operating station having a portable holding device H. This holding device may be of any suitable construction, preferably one such as that shown at H of my copending application, Serial No. 311,555, filed December 29, 1939, and issued February 23, 1943, as Patent No. 2,311,709, being employed. Such a holder comprises a flat rectangular shaped body portion 33 having a plurality of integral hollow projections or protuberances 34 providing frusto conical sockets to individually receive the confections. A movable frame 35 is mounted beneath the body 33 of the holder and carries a plurality of pins or sabers 36 which are movable into and out of the sockets of the holder through suitable openings formed in the sides of the protuberances 34. Movement of the frame 35 to simultaneously project or retract the sabers 36 is effected by means of a suitably connected lever 37.

The holder H is mounted on a supporting structure S comprising uprights 38 and 39, the lower ends of which are carried by a connecting member 40 and laterally extending foot portions 41. The supporting structure may be conveniently formed of angle shaped metal sections as shown, the several parts being suitably connected together as by welding. A one-piece metal body of L-shape having a longitudinally extending portion 42 and an end portion 43 is secured to the upright members 38 and 39 of the structure at points above the base members 40 and 41 and so as to be disposed in approximately horizontal position. The end portion 43 extends laterally from the portion 42 in parallel relation to the footing elements 41 and is supported cantilever fashion.

Figure 5:
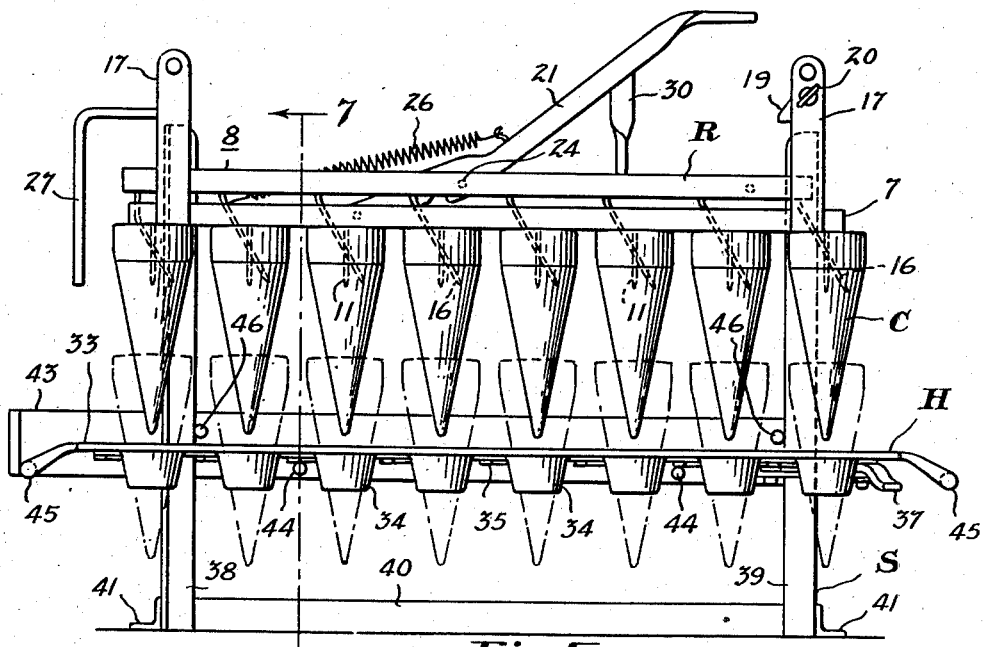
Fig. 5 is a side elevational view of a confection holder having a multiplicity of individual pockets for receiving the confections and a supporting structure for mounting the holder. In this view the retaining device or impaler illustrated in the preceding figures is shown above the holder and carrying a number of confections about to be lowered into the sockets of the holder.

A number of support rods 44 are secured, as by welding, to the body portion 42 between the uprights 38 and 39 and extend in parallel relation to one another and to the end portion 43. These support rods 44 are thus carried cantilever fashion over the table on which the supporting structure is mounted and receive the holder H to support the latter in spaced relation above the table so that confections received in the sockets and projecting through the bottom of the holder, as shown diagrammatically in Fig. 5, are elevated above the supporting surface of the table on which the device is mounted. Preferably, the supporting rods 44 are so spaced as to be received between predetermined groups of the protuberances 34 when one of the handles 45 of the holder H slidingly engages the cantilever end portion 43 of the body of the frame to guide the holder into a predetermined position on the support rods 44. The uprights 38 and 39 constitute limit means or stops to locate the holder on the rods 44 by engagement with the rear edge of the body 33 of the holder.

A pair of retaining rods 46 are also secured as by welding to the body member 42 of the supporting structure and extend laterally therefrom in parallel relation to the support rods 44. The retaining rods 46, however, are disposed above the level of the support rods 44 so as to extend above the body 33 of the holder and between adjacent groups of the sockets in the holder.

The operator carrying the portable retainer R with the confections C depending therefrom, as previously mentioned, positions the retainer above the holder H which is mounted on the supporting structure S.

Figure 6:
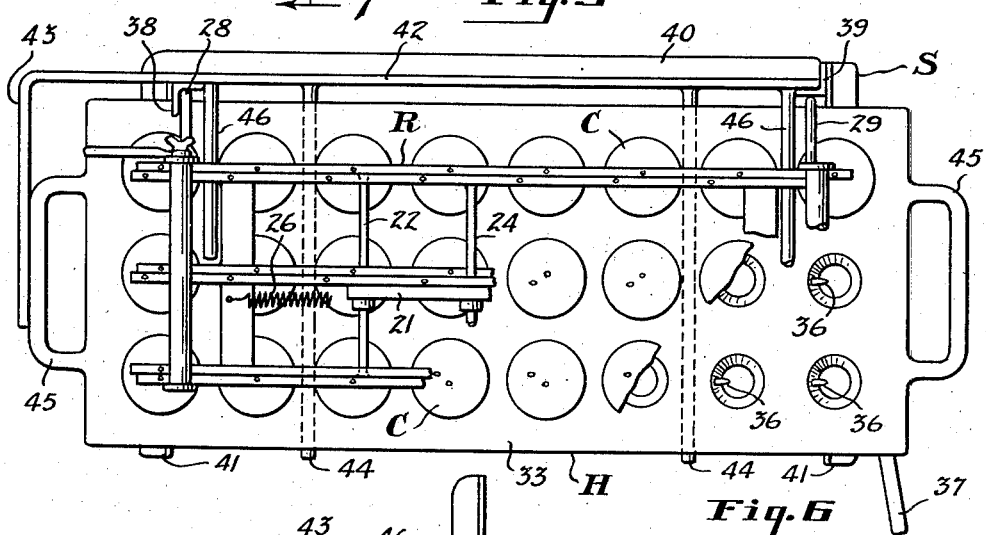
Fig. 6 is a plan view of the apparatus shown in Fig. 5 with parts broken away.
Figure 7:
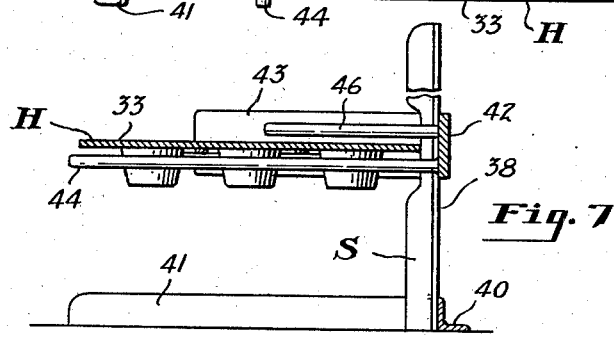
Fig. 7 is a transverse sectional view with parts removed showing the confection holder and the supporting structure therefor of Fig. 5 and taken substantially on the line indicated at 7—7 of Fig. 5.

One of the uprights of the supporting structure, preferably the uprights 38, is arranged so that the angle thereof receives the depending leg portion of the guide 28 on the retainer. Accordingly, the operator first places the bottom portion of the guide 28 in the angle of the upright 38 and then swings the retainer R in a counterclockwise direction as viewed in Fig. 6, to abut the lower end of the guide 29 against the flat surface of the support structure upright 39. Thus the retainer R is definitely located in predetermined position above the holder H, the latter also being located in predetermined position on the supporting structure S. Accordingly, the confections C are individually aligned with the sockets in the holders H so that upon lowering the retainer with the guides 28 and 29 cooperating with the guide surfaces of the uprights 38 and 39 of the supporting structure, the confections are accurately lowered into the sockets of the holders H. As the lowering of the retainer occurs a considerable length of the depending leg portion of the guide 28 is received in the angle of the supporting structure upright 28, which serves to maintain the retainer in parallel relation to the holder H during the relative movement of the retainer toward the holder. Similarly, an increasing length of the depending leg of the guide 29 engages the flat surface of the supporting structure upright 39 to assist in retaining parallelism between the devices during the lowering of the retainer.

When the confections are received in the sockets of the holders H the lever 37 is shifted to project the sabers or pins 36 into the sides of the wafer cones 2, thus locking the confections in the sockets of the holder. The operator then raises the lever 21 to the position shown in Fig. 4, which withdraws the impalers 16 from the confections. The retainer R is subsequently lifted bodily to withdraw the impalers 11 from the confections. In this manner the several pairs of impalers are withdrawn successively from the confections. During the withdrawal of the impalers 16 the retainer R having the impalers 11 embedded in the confections serves to prevent lifting of the latter, while during the withdrawal of the impalers 11 by bodily lifting of the retainer, the holder H is held in place by the retaining rods 46 which prevent lifting of the holder off the supporting structure. Furthermore, the initial withdrawing of the impalers 16 tends to loosen the confections from the impalers 11 so that the latter are subsequently withdrawn with greater facility.

After the retainer R has been withdrawn the operator removes the portable holder H with the confections located therein and further processes the confections in accordance with well known practice.

The principles of the present invention may be utilized in various ways, numerous modifications and alterations being contemplated, substition of parts and changes in construction being resorted to as desired, it being understood that the embodiment shown in the drawings and described above is given merely for purposes of explanation and illustration without intending to limit the scope of the claims to the specific details disclosed.

What I claim is:

1. Apparatus for handling confections comprising a portable holder having a plurality of spaced sockets for individually receiving confections, a structure for supporting the holder and having limit means for engaging the holder to locate the latter in predetermined position thereon, a portable retainer having means for individually engaging a plurality of confections for simultaneously carrying the confections, and cooperating guide means on the supporting structure and the retainer for respectively aligning the several confection engaging means of the retainer with the several sockets of a supported holder while the retainer and the holder are relatively spaced apart and for guiding the retainer and the holder to maintain parallelism therebetween as they are moved relatively together.

2. Apparatus for handling confections comprising a portable holder having a plurality of spaced sockets for individually receiving confections, a structure for slidingly receiving the holder and having limit means for engaging the sliding holder to locate the latter in predetermined supported position thereon, a portable retainer having means for individually engaging a plurality of confections for simultaneously carrying the confections, and cooperating relatively slidable guide means on the supporting structure and the retainer for respectively aligning the several confection engaging means of the retainer with the several sockets of a supported holder while the retainer and the holder are relatively spaced apart and for guiding the retainer and the holder to maintain parallelism therebetween as they are moved relatively together.

3. Apparatus for handling confections comprising a portable holder having a plurality of spaced sockets for individually receiving confections, a structure for supporting the holder, said structure having horizontally extending vertically spaced members adapted to receive the holder therebetween and limit means for engaging the holder to locate the latter in predetermined position between said members, a portable retainer having means for individually engaging a plurality of confections for simultaneously carrying the same, cooperating guide means on the supporting structure and the retainer for respectively aligning the several confection engaging means of the retainer with the several sockets of a received and located holder and for maintaining said alignment and keeping the holder and the retainer parallel as the retainer is lowered toward the holder, and means on the holder for locking confections in the sockets, whereby confections carried to the holder and locked in the sockets of the latter can be withdrawn in unison from the confection engaging means of the retainer by lifting the retainer away from the holder, the member extending over the holder engaging the latter to prevent lifting thereof.

4. A portable confection handling device comprising a first frame having a plurality of impalers extending from one side thereof in normally depending parallel relation to one another, a second frame having a plurality of impalers extending from one side thereof in normally depending parallel relation to one another, and means connecting the frames together for relative movement with the impalers of the second frame disposed in angular relation to the impalers of the first frame so that by relative movement of the frames the impalers of the second frame can be made to move into or out of confections disposed on the impalers of the first frame along lines disposed obliquely to the impalers of the first frame.

5. A confection handling device comprising a pair of superposed frames having downwardly extending impalers, the impalers of each frame being disposed in parallel relation, the impalers of the upper frames projecting through the lower frames and being disposed at an angle to the impalers of the lower frame, certain of the impalers of the upper frame having sliding engagement with the lower frame to guide the upper frame and restrict the impalers of the upper frame to endwise movement, and means for moving the upper frame toward or away from the lower frame.

6. A confection handling device comprising a pair of superposed frames having downwardly extending impalers, the impalers of each frame being disposed in parallel relation, the impalers of the upper frames projecting through the lower frames and being disposed at an angle to the impalers of the lower frame, certain of the impalers of the upper frame having sliding engagement with the lower frame to guide the upper frame and restrict the impalers of the upper frame to endwise movement, a spring for normally holding the upper frame in elevated position, and a lever for depressing the upper frame in opposition to said spring.

7. A confection handling device of the character described, comprising a pair of substantially parallel frames, means for moving said frames together or apart, a plurality of impalers rigidly secured to each frame, the impalers of one frame being at right angles thereto and the impalers of the second frame being disposed at an angle to the impalers of the first, means on the first frame engaged by impalers carried by said second frame to guide said impalers for endwise movement during relative movement of the frames.

8. A confection handling device of the character described, comprising a pair of frames each having a plurality of impalers fixed thereto and extending laterally therefrom, the impalers of one frame being at right angles thereto and the impalers of the second frame being disposed at an angle to the impalers of the first, means on the first frame engaged by impalers carried by said second frame to guide said impalers for endwise movement during relative movement of the frames, and a lever having pivotal connection with each of the frames, said levers being actuable to move the frames relatively toward and away from one another.

CARL R. TAYLOR.